United States Patent
Von Novak et al.

(10) Patent No.: US 9,831,705 B2
(45) Date of Patent: Nov. 28, 2017

(54) RESOLVING COMMUNCATIONS IN A WIRELESS POWER SYSTEM WITH CO-LOCATED TRANSMITTERS

(71) Applicant: QUALCOMM Incorporated, San Diego, CA (US)

(72) Inventors: William H. Von Novak, San Diego, CA (US); Edward Kallal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 530 days.

(21) Appl. No.: 13/783,151

(22) Filed: Mar. 1, 2013

(65) Prior Publication Data

US 2014/0159651 A1    Jun. 12, 2014

Related U.S. Application Data

(60) Provisional application No. 61/736,143, filed on Dec. 12, 2012.

(51) Int. Cl.
| | |
|---|---|
| H02J 7/00 | (2006.01) |
| H02J 7/02 | (2016.01) |
| H04B 5/00 | (2006.01) |

(52) U.S. Cl.
CPC ............ H02J 7/025 (2013.01); H04B 5/0037 (2013.01); H04B 5/0031 (2013.01)

(58) Field of Classification Search
USPC ........................................................ 320/108
See application file for complete search history.

(56) References Cited

U.S. PATENT DOCUMENTS

| | | | |
|---|---|---|---|
| 8,044,804 B1 | 10/2011 | McReynolds | |
| 8,060,011 B2 * | 11/2011 | Jin | ........................ H02J 5/005 320/108 |
| 8,185,755 B2 * | 5/2012 | Yamasuge | ..................... 713/300 |
| 8,248,026 B2 | 8/2012 | Sip | |

(Continued)

FOREIGN PATENT DOCUMENTS

| | | |
|---|---|---|
| CN | 101330230 A | 12/2008 |
| CN | 101572444 A | 11/2009 |

(Continued)

OTHER PUBLICATIONS

International Search Report and Written Opinion—PCT/US2013/073663—ISAEPO—Mar. 18, 2014.

*Primary Examiner* — Robert Grant
(74) *Attorney, Agent, or Firm* — Knobbe, Martens, Olson & Bear, LLP

(57) ABSTRACT

In one aspect, a wireless charger may include a wireless power antenna, a wireless power transmitter coupled to the wireless power antenna and configured to generate a wireless charging field in a charging region, a first communication antenna, a first transceiver coupled to the communication antenna and configured to communicate with the chargeable device via the communication antenna, a first signal strength detector configured to determine a signal strength of a first signal received by the transceiver, and a controller configured to determine whether the chargeable device is within the charging region based at least in part on the signal strength of the first signal.

30 Claims, 10 Drawing Sheets

(56) References Cited

U.S. PATENT DOCUMENTS

| | | |
|---|---|---|
| 9,660,478 B2 | 5/2017 | Von Novak et al. |
| 2006/0038719 A1 | 2/2006 | Pande et al. |
| 2009/0108805 A1 | 4/2009 | Liu et al. |
| 2009/0243397 A1 | 10/2009 | Cook et al. |
| 2009/0312046 A1 | 12/2009 | Clevenger et al. |
| 2010/0156347 A1 | 6/2010 | Lee et al. |
| 2010/0176934 A1 | 7/2010 | Chou et al. |
| 2010/0181961 A1 | 7/2010 | Novak et al. |
| 2010/0201201 A1 | 8/2010 | Mobarhan et al. |
| 2010/0277003 A1 | 11/2010 | Von Novak et al. |
| 2010/0311328 A1 | 12/2010 | Kargl et al. |
| 2011/0025264 A1 | 2/2011 | Mochida et al. |
| 2011/0093139 A1 | 4/2011 | Arms et al. |
| 2011/0115432 A1 | 5/2011 | El-Maleh et al. |
| 2011/0254503 A1 | 10/2011 | Widmer et al. |
| 2011/0279226 A1 | 11/2011 | Chen et al. |
| 2012/0007437 A1 | 1/2012 | Fells et al. |
| 2012/0098483 A1* | 4/2012 | Patel .......................... 320/108 |
| 2012/0119587 A1 | 5/2012 | Cheon et al. |
| 2012/0139356 A1 | 6/2012 | Jung et al. |
| 2012/0223585 A1 | 9/2012 | Urano |
| 2012/0280650 A1 | 11/2012 | Kim et al. |
| 2012/0286730 A1 | 11/2012 | Bonny |
| 2012/0309306 A1 | 12/2012 | Kim et al. |
| 2012/0326658 A1 | 12/2012 | Kim et al. |
| 2012/0326660 A1 | 12/2012 | Lu et al. |
| 2012/0329405 A1 | 12/2012 | Lee et al. |
| 2014/0159653 A1 | 6/2014 | Von Novak et al. |

FOREIGN PATENT DOCUMENTS

| | | |
|---|---|---|
| CN | 101983467 A | 3/2011 |
| CN | 102027654 A | 4/2011 |
| CN | 102555832 A | 7/2012 |
| DE | 102011100095 A1 | 10/2012 |
| WO | WO-2007042953 A2 | 4/2007 |
| WO | WO-2010085701 | 7/2010 |
| WO | WO-2010093719 | 8/2010 |

* cited by examiner

RESOLVING COMMUNCATIONS IN A WIRELESS POWER SYSTEM WITH CO-LOCATED TRANSMITTERS

CROSS REFERENCE TO RELATED APPLICATIONS

This application claims benefit under 35 U.S.C. §119(e) to U.S. Provisional Patent Application No. 61/736,143 entitled "RESOLVING COMMUNICATIONS IN A WIRELESS POWER SYSTEM WITH CO-LOCATED TRANSMITTERS" filed on Dec. 12, 2012; the disclosure of which is hereby incorporated by reference in its entirety.

FIELD

The present invention relates generally to wireless power transfer. More specifically, the disclosure is directed to systems, methods, and devices for establishing data communications between a wireless power receiver and a wireless power transmitter where the receiver may be positioned within the wireless charging region of the wireless power transmitter but capable of establishing data communications with one or more additional wireless power transmitters.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a wireless charger for charging a chargeable device, the wireless charger comprising a wireless power antenna, a wireless power transmitter coupled to the wireless power antenna and configured to generate a wireless charging field in a charging region, a first communication antenna, a first transceiver coupled to the communication antenna and configured to communicate with the chargeable device via the communication antenna, a first signal strength detector configured to determine a signal strength of a first signal received by the transceiver, and a controller configured to determine whether the chargeable device is within the charging region based at least in part on the signal strength of the first signal.

Another aspect of the present disclosure provides a method for charging a chargeable device via a wireless charger, the method comprising, receiving a first signal from the chargeable device via a first communication antenna, determining a signal strength of the first signal, and determining whether the chargeable device is within a charging region based at least in part on the signal strength of the first signal Another aspect of the present disclosure provides a wireless charger for charging a chargeable device, the wireless charger comprising means for transmitting power wirelessly, means for generating a wireless charging field in a charging region via the means for transmitting power, means for transmitting or receiving communication signals, means for communicating with the chargeable device via the means for transmitting or receiving communication signals, means for determining a signal strength of a first signal received by the means for communicating, and means for determining whether the chargeable device is within the charging region based at least in part on the signal strength of the first signal.

Figure 1:
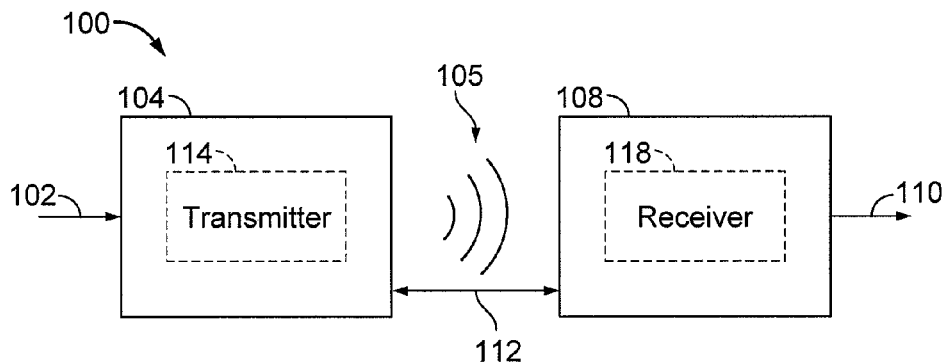
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

In some wireless power systems, and as will be described below, the transmitter and receiver communicate on a frequency other than that being used to transfer power. In some embodiments, it is desirable to establish this so-called out-of-band communication channel independent of the wireless power field used to transfer power. The out-of-band communication channel is useful to improve the functionality of the in-band transmitter and receiver circuitry. Because in-band power transfer and the out-of-band communication channel have different characteristics, a receiver may be out of out of range for wireless power from a transmitter but within range for out-of-band communication. As a result, when multiple transmitters are present within a given space, it is important to ensure that receiver within a wireless power field establishes the out-of-band communication channel with the transmitter generating the field. Otherwise, information transmitted over the out-of-band communications channel communications used to optimize power transfer may be ineffective.

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
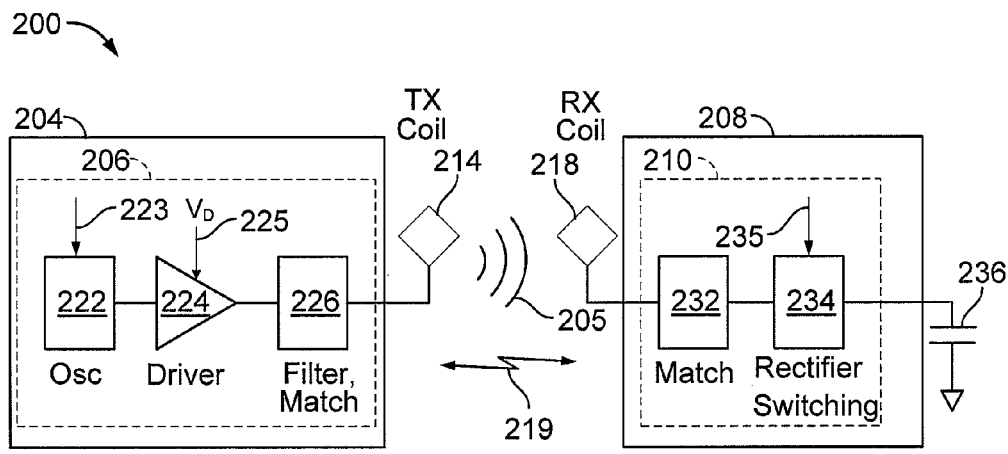
FIG. 2 is a functional block diagram of exemplary components that may be used in the wireless power transfer system of FIG. 1, in accordance with various exemplary embodiments of the invention.

FIG. 2 is a functional block diagram of exemplary components that may be used in the wireless power transfer system 100 of FIG. 1, in accordance with various exemplary embodiments of the invention. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or power an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate, or out-of-band, communication channel 219 (e.g., Bluetooth, ZigBee, cellular, etc.). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
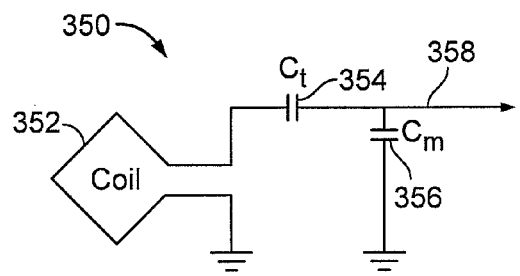
FIG. 3 is a schematic diagram of a portion of transmit circuitry or receive circuitry of FIG. 2 including a transmit or receive antenna, in accordance with exemplary embodiments of the invention.

FIG. 3 is a schematic diagram of a portion of transmit circuitry 206 or receive circuitry 210 of FIG. 2 including a transmit or receive antenna 352, in accordance with exemplary embodiments of the invention. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmit antenna 214 coil to the receive antenna 218 residing in the neighborhood where this field 105 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
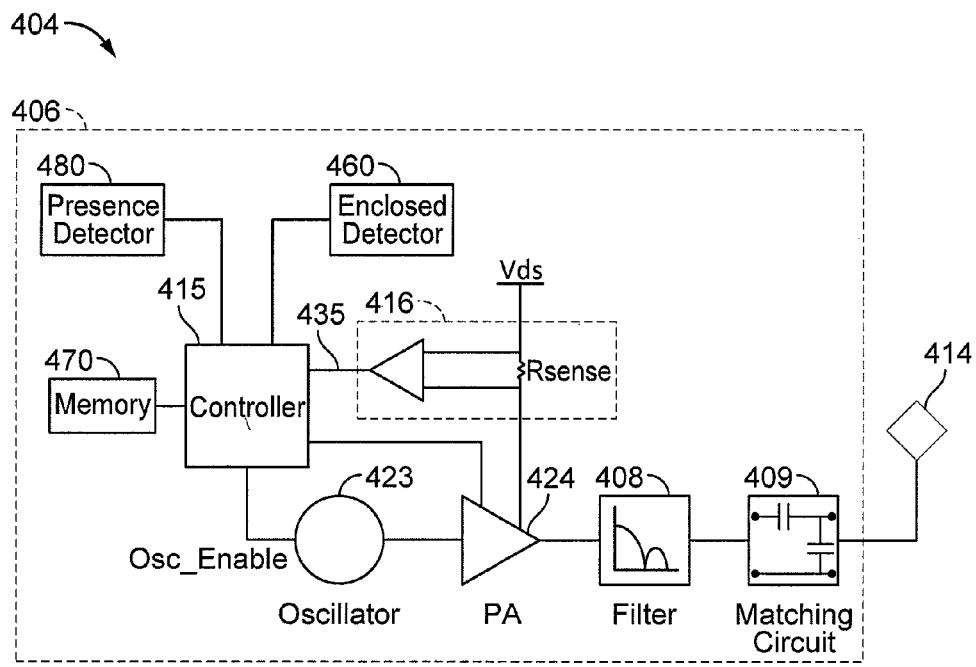
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
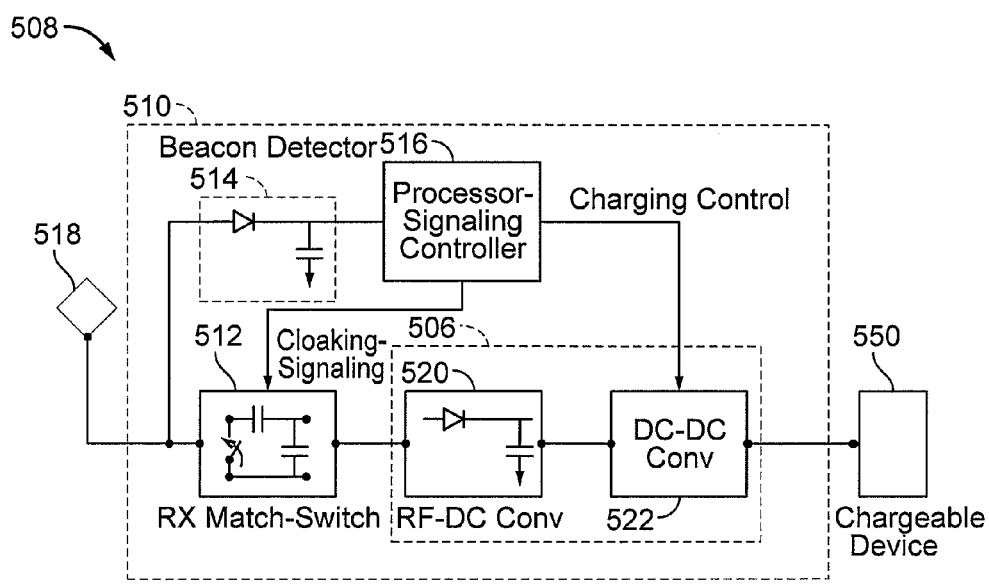
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive antenna 518. Receiver 508 further couples to chargeable device 550 for providing received power thereto. It should be noted that receiver 508 is illustrated as being external to chargeable device 550 but may be integrated into chargeable device 550. Energy may be propagated wirelessly to receive antenna 518 and then coupled through the rest of the receive circuitry 510 to chargeable device 550. By way of example, the chargeable device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated chargeable device 550. By way of example, chargeable device 550 may be a portable electronic device having diametric or length dimension smaller that the diameter of length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of chargeable device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the chargeable device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with chargeable device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of chargeable device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to chargeable device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
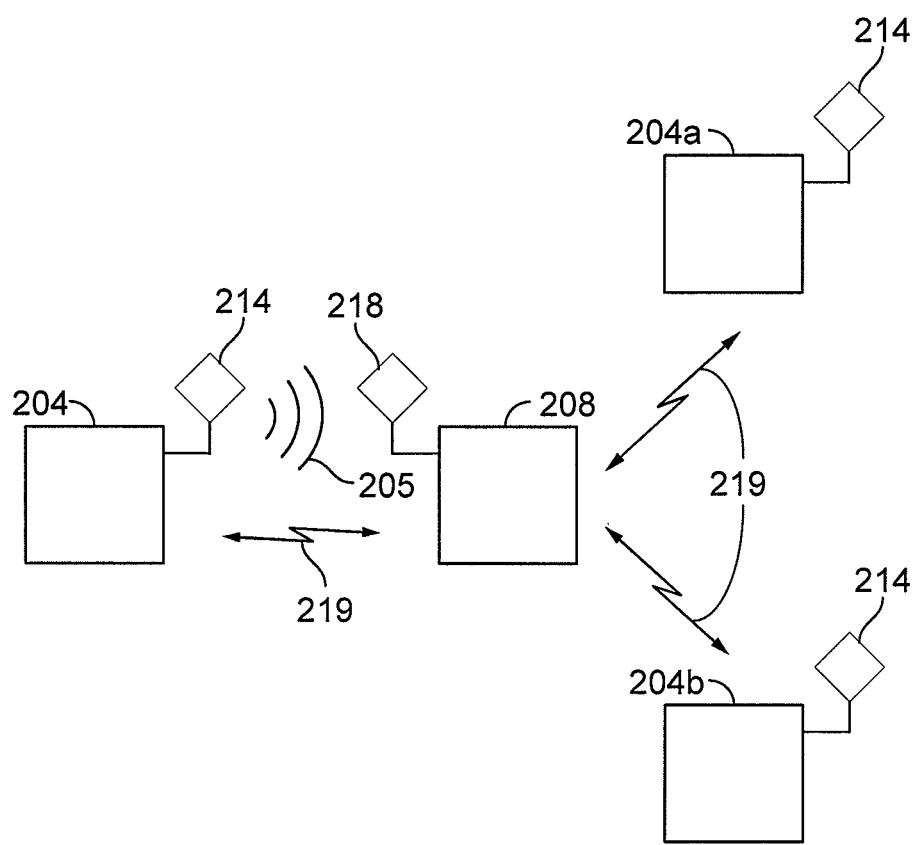
FIG. 6 is a functional block diagram of a receiver in the presence of multiple transmitters, in accordance with exemplary embodiments of the invention.

When multiple transmitters are within out-of-band communication range of a receiver, it is important to establish communications with the transmitter best suited for transferring wireless power to the receiver. Out-of-band communications between the transmitter and the receiver can be carried out over a separate communication channel from the wireless power transfer field, as described below. FIG. 6 is a functional block diagram depicting the case where a receiver is located in proximity to multiple transmitters. As shown, receiver 208 is located so as to receive wireless power from transmitter 204 via field 205. However, receiver 208 is capable of establishing an out-of-band communication channel 219 with transmitters 204, 204a, and 204b. Thus, should receiver 208 establish channel 219 with transmitter 204a or 204b, any subsequent communications related to power transfer would be irrelevant. This situation may be referred to herein as a misconnection.

Figure 7:
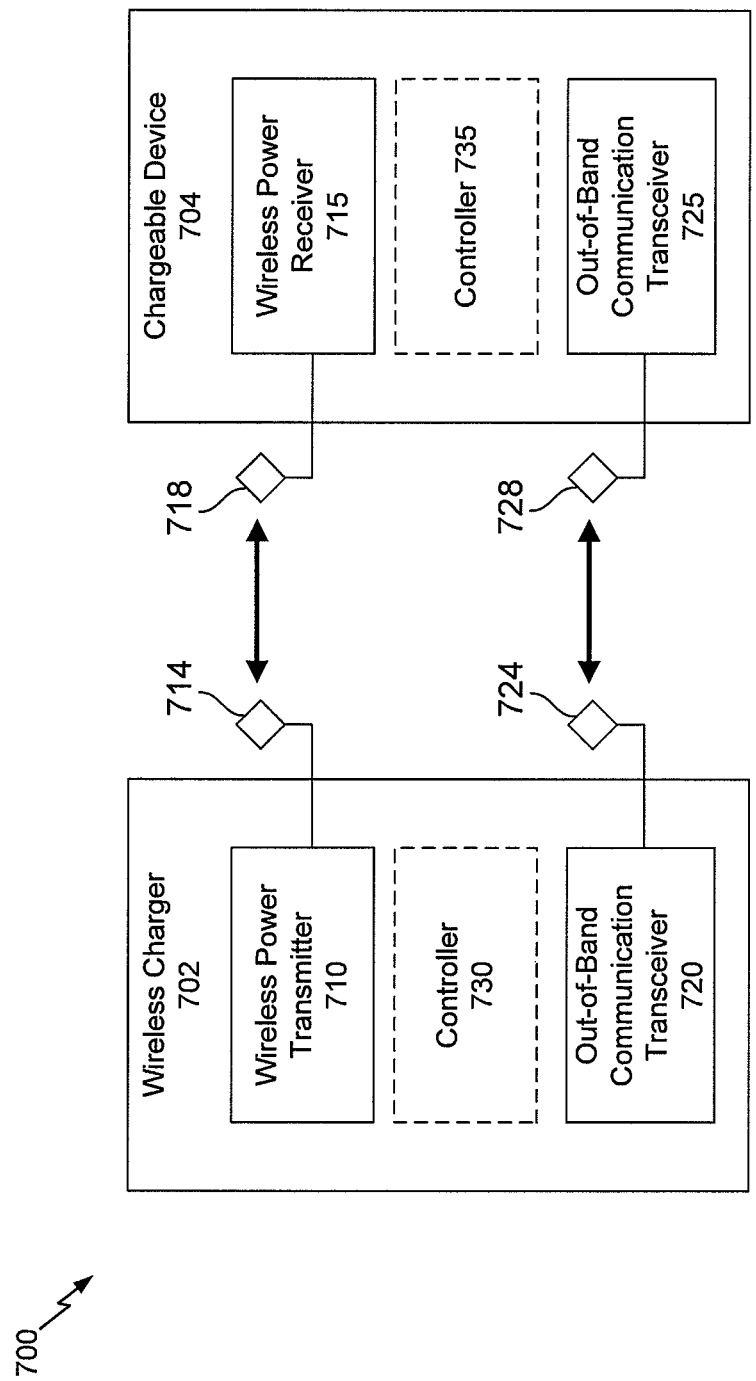
FIG. 7 is a block diagram of a wireless charging system that may incorporate the transmit circuitry of FIG. 4 and the receive circuitry of FIG. 5.

FIG. 7 is a block diagram of a wireless charging system 700 capable of out-of-band communications that may incorporate the transmit circuitry 406 of FIG. 4 and the receive circuitry 510 of FIG. 5. The wireless charging system 700 may comprise a wireless charger 702 and a chargeable device 704. The wireless charger 702 may include a wireless power transmitter 710 and an out-of-band communication transceiver 720. In an embodiment, the wireless power transmitter 710 may be similar to and/or include the same functionality as the transmit circuitry 406 of FIG. 4. The chargeable device 704 may be similar to the chargeable device 550 of FIG. 5 and further include a wireless power receiver 715 and an out-of-band communication transceiver 725. In an embodiment, the wireless power receiver 715 may be similar to and/or include the same functionality as the receive circuitry 510 of FIG. 5.

The wireless power transmitter 710 may be coupled to a transmit antenna 714. The transmit antenna 714 may be similar to the transmit coil 414 of FIG. 4. Likewise, the wireless power receiver 715 may be coupled to a receive coil 718. The receive coil 718 may be similar to the receive coil 518 of FIG. 5. In an embodiment, the wireless power transmitter 710 may be configured to transmit power wirelessly to the wireless power receiver 715 to charge the chargeable device 704.

The out-of-band communication transceiver 720 may be coupled to antenna 724 and the out-of-band communication transceiver 725 may be coupled to antenna 728. In an embodiment, the out-of-band communication transceivers 720 and 725, via antennas 724 and 728, may be used to establish a connection between the wireless charger 702 and the chargeable device 704 such that the chargeable device 704 can receive power wirelessly from the wireless charger 702 in order to charge its battery or similar device. The out-of-band communication may be implemented through the use of any wireless communication protocol (e.g., a proprietary communication protocol, a communication protocol established by a standards organization like IEEE, etc.). For example, IrDA, Wireless USB, Z-Wave, ZigBee, and/or the like may be used.

Figure 8:
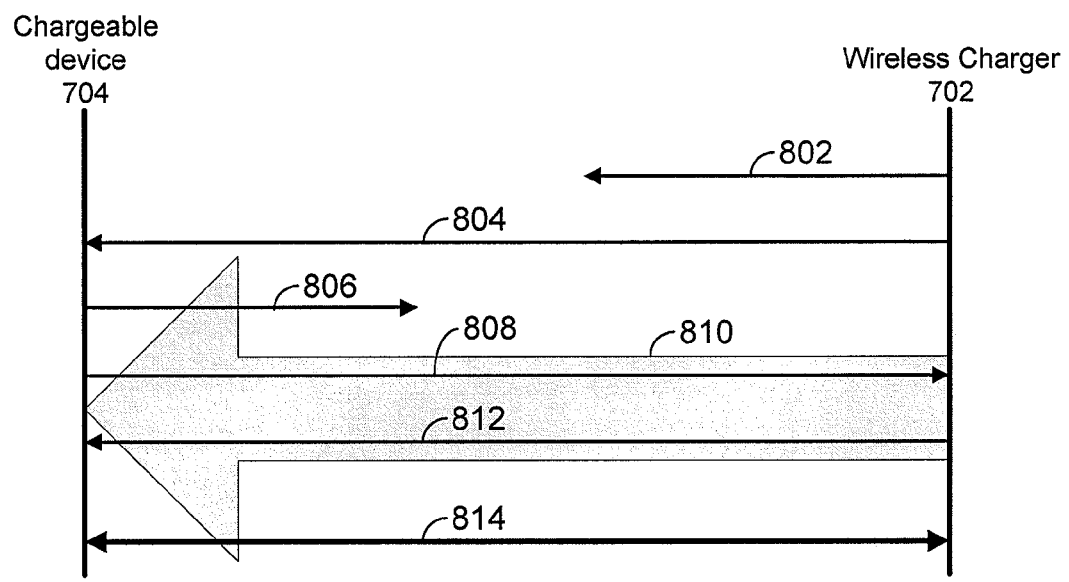
FIG. 8 is a timing and signal flow diagram of communications between a wireless charger and a chargeable device, such as the wireless charger and the chargeable device of FIG. 7, to establish a connection between the wireless charger and the chargeable device.

To better understand the resolution techniques disclosed herein, it is helpful to understand an exemplary method for establishing an out-of-band communication channel. FIG. 8 is a timing and signal flow diagram of communications between a wireless charger and a chargeable device, such as the wireless charger 702 and the chargeable device 704, to establish a connection between the wireless charger and the chargeable device. The wireless charger 702 may transmit a power pulse 802 (e.g., a beacon signal), where the power pulse 802 can be used to supply power to a chargeable device, like chargeable device 704, to charge the chargeable device. The wireless charger 702 may transmit the power pulse 802 in order to detect a chargeable device. As illustrated in FIG. 8, the power pulse 802 was transmitted, but no chargeable device was in range of the power pulse 802. The wireless charger 702 may wait a period of time before transmitting another power pulse 804. For example, the wireless charger 702 may wait 1 second between pulses. Upon transmitting the power pulse 802 and/or 804, the wireless charger 702 may start a general connection establishment procedure. As illustrated in FIG. 8, the power pulse 804 was transmitted and in range of the chargeable device 704.

Once the wireless charger 702 detects a load on the power pulse 804, the wireless charger 702 begins scanning for a broadcast from a device, like the chargeable device 704. In this manner, the wireless charger 702 may conserve power by only scanning for a broadcast once it detects a load on a power pulse. In an embodiment, the power pulse 804 causes the chargeable device 704 to generate a broadcast (e.g., a processor of the chargeable device 704 may generate the broadcast). As an example, the broadcast 806 may be message(s) transmitted over Bluetooth Low Energy channels. The chargeable device 704 may transmit the broadcast 806 with the wireless charger 702 as the intended recipient. If the broadcast 806 does not reach the wireless charger 702 (as depicted in FIG. 8), then the chargeable device 704 may generate and transmit another broadcast 808. For example, the chargeable device 704 may wait 20 ms before sending another broadcast 808. If a connection is not established within a certain time frame, such as 10 seconds, the chargeable device 704 may exit a connectable mode and stop any charging that may have started. In this manner, the chargeable device 704 may conserve power by only generating and transmitting a broadcast 806 and/or 808 once it receives a power pulse 802 and/or 804 from the wireless charger 702.

Note that there are numerous situations in which a misconnect may occur. For example, another device besides chargeable device 704, or an object in the vicinity of the wireless charger 702, may cause the wireless charger 702 to detect a load and begin scanning for a broadcast. As another example, some chargers may continually scan for a broadcast independent of the timing of power pulses 802 and 804. As yet another example, some chargeable devices may continually broadcast independent of the timing of power pulses 802 and 804. As yet another example, a wireless charger may respond to a broadcast before the charger which originated a power pulse, preempting the initialization of communications. Consequently, in these and other situations the wireless charger 702 may inadvertently establish communications with a chargeable device located outside an effective charging region, resulting in a misconnection.

Once the wireless charger 702 receives the broadcast 808, the wireless charger may transmit a connection request 812 to the chargeable device 704. If the chargeable device 704 accepts the connection request 812, then a connection 814 is established between the wireless charger 702 and the chargeable device 704.

Note that during the connection process illustrated in FIG. 8, the wireless charger 702 may continue to transmit power 810, such as via the power pulse 802 and/or 804, in order to charge the chargeable device 704. In some aspects, the chargeable device 704 may be in a charger powered mode, and the power 810 would allow the chargeable device 704 to remain active in order to establish a connection with the wireless charger 702. Once the wireless charger 702 determines that a connection cannot be established, that the chargeable device 704 is now in a self-powered mode, and/or that the chargeable device 704 otherwise does not need the power transmitted from the wireless charger 702, then the wireless charger 702 may stop transmitting the power 810.

If a connection is lost at any point, the chargeable device 704 may attempt to reconnect with the wireless charger 702. Alternatively, the chargeable device 704 may wait until it receives another power pulse 802 and/or 804 from the wireless charger 702.

Several techniques disclosed herein may be used to ascertain whether an out-of-band communication channel has been improperly established between a transmitter and a receiver (e.g., a misconnection). These techniques are referred to herein as resolution techniques. Some of these resolution techniques do not necessarily guarantee an out-of-band communication channel has been established between the optimal transmitter and receiver. Instead, some techniques tend to inferentially support or undermine the propriety of the established communication channel. Accordingly, one or more of these resolutions techniques may be used in a wireless power transfer system. Further, the output of these resolution techniques may be compared against a threshold for that particular technique and/or combined with other techniques disclosed herein. The outputs of these techniques may be weighted and used in a probabilistic or fuzzy logic type model to evaluate whether there has been a misconnection and out-of-band communication should attempt to reconnect.

The resolution techniques may be carried out by a controller (e.g., controller 415 of FIG. 4, processor 416 of FIG. 5, controllers 730, 735 of FIG. 7.) In one embodiment, the resolution technique(s) may be evaluated by a transmitter-side controller with receiver-side measurements transmitted over the out-of-band communication channel. In another embodiment, the resolution techniques may be evaluated either transmitter-side or receiver-side, with the resulting output(s) transmitted via the out-of-band communication channel to the transmitter (or receiver.) Further, upon identifying a misconnection but before dropping the out-of-band communication channel, the local controller may notify the remote controller of the misconnection.

In a first resolution technique, time coincidence is used to relate operation of a transmitter to operation of a receiver. That is, a lapsed time is measured between transmitter (e.g., wireless charger 702) power up and receiver (e.g., chargeable device 704) communication. For example, wireless charger 702 may initiate a timer upon transmitting a power pulse 804. The closer in time wireless charger 702 receives broadcast 808 from chargeable device 704, the better the correlation between wireless charger and chargeable device and therefore the less likely there is a misconnection. This technique may further include transmitting information in the broadcast 808 related to the amount of time that lapsed between the chargeable device 704 receiving the power pulse 804 and transmitting the respective broadcast 806/808 (e.g., a "startup" time). Upon receipt of a broadcast including information related to this startup time, the wireless charger 702 may subtract this time from the initiated timer to further improve the correlation. For example, if power pulse 804 is transmitted at time t=0 and broadcast 808 is received at time t=90 ms indicating a startup time of 80 ms, a small non-negative time difference (10 ms) reduces the likelihood of a misconnection. However, if the startup time indicated was 120 ms, it is likely the chargeable device 704 was transmitting a broadcast 808 in response to the power pulse of another wireless charger. Because multiple wireless chargers may power up simultaneously (e.g., by a switch), this technique may further include each wireless charging delaying a random amount of time prior to transmitting power pulses. As a result, the timing of power pulses received by a chargeable device from individual wireless chargers may be spaced to improve the correlative effect of this technique.

In a second resolution technique, passive tests are applied to a wireless power system to check whether it exhibits expected behavior. "Passive" tests generally refer to tests that do not disturb normal operation of the wireless power system. A system that does not behave correctly is more likely to have a misconnection. If a misconnection is detected according to one or more of the passive tests described herein, a misconnection state may be triggered to initiate a wireless charging recovery routine, such as a state or null reset wherein devices must re-establish connection to re-enable wireless power transfer. A first expected behavior contemplated by this technique involves the relationship between the rectifier output voltage, $V_{reg}$ (e.g., as measured at output of rectifier and switching circuit 234 or RF-to-DC converter 520), and the transmitter loop current, $I_{tx}$ (e.g., as measured through transmit antenna 214, 414, or 714). In a normally operating system, $V_{reg}$ tracks $I_{tx}$. If the system unexpectedly saturates (e.g., $I_{tx}$ reaches a maximum value without a corresponding increase in $V_{reg}$), it is more likely that there is a misconnection. In this scenario, the receiver is likely requesting additional power from a transmitter it has established an out-of-band communication channel with that is not the transmitter it is receiving power from. A second expected behavior contemplated by this technique involves the relationship between receiver power and transmitter power. In a normally operating system, when receiver power increases, then transmitter power should also increase. If the transmitter power does not increase, it is more likely that there is a misconnection. A third expected behavior contemplated by this technique involves monitoring $V_{reg}$ after a receiver requests a change in $I_{tx}$. In a normally operating system, a receiver periodically requests changes in $I_{tx}$, e.g., to accommodate changes in load or distance. If, as a result of such a request, the transmitter modifies its loop current and the receiver does not see a change the rectifier output voltage, it is more likely that there is a misconnection. The various parameters mentioned above (e.g., $V_{reg}$, $I_{tx}$, saturation, receiver power, transmitter power) may be communicated between the transmitter and receiver via the out-of-band communication channel. In this manner, either transmitter or receiver may be used to evaluate the likelihood of a misconnection.

In a third resolution technique, active tests are applied to a wireless power system to check whether it responds with expected behavior. In contrast to passive tests described above, "active" tests generally refer to tests that may disturb normal operation of the wireless power system. A system that does not respond correctly is more likely to have a misconnection. If a misconnection is detected according to one or more of the active tests described herein, a misconnection state may be triggered to initiate a wireless charging recovery routine. In an exemplary test, the transmitter introduces a transient in $I_{tx}$. In response, $V_{reg}$ should similarly increase. If the receiver does not observe a change in $V_{reg}$, it is more likely that there is a misconnection. One variant of this test involves randomizing the timing of when the transmitter introduces transients into the system. Such randomization helps reduce the odds of two transients happening simultaneously (e.g., the transmitter ramps up $I_{tx}$ but there is an independent, corresponding decrease in the load resulting in an increase in $V_{reg}$). In yet another test, the transmitter may stop transmitting power, reducing $I_{tx}$ to zero, and check whether the out-of-band communication channel with the receiver is still active. If the channel remains active, and assuming the receiver out-of-band communications transceiver configured to deactivate in response to no longer receiving wireless power, a misconnection is proven. Note, unlike many of the other resolution techniques disclosed herein, this latter active test provides a final determination of a misconnection.

In a fourth resolution technique, a wireless charger may maintain a dynamic list of chargeable devices which are "known present" or "known distant" to some acceptable level of certainty. A chargeable device on the "known present" list is by default connected to, whereas a chargeable device on the "known distant" list is by default not connected to. A timeout period may control when a device is cleared from either list, pending a subsequent evaluation of the likelihood the device is either "known present" or "known distant." The timeout period may be set depending on the expected use of the particular wireless power system (e.g., on the order of 20-30 minutes in a home, or 1-5 minutes on a subway). This allows recovery from conditions in which a chargeable device is placed on the wrong list. Examples of events that may place a device on the "known present" list include those events that confirm a proper connection, e.g., a passive test, an active test, some combination of resolution techniques disclosed herein, etc. Examples of events that may place a device on the "known distant" list include those events that confirm a misconnection, e.g., a passive test, an active test, some combination of resolution techniques disclosed herein, a new connection request arriving when power is not being transmitted (discussed below), etc.

A fifth resolution technique takes advantage of the chargeable device being "aware" of the first receipt of a power pulse. In the messaging that occurs after receipt of the power pulse, e.g., broadcast 808, the chargeable device may set a message flag indicating it is its first attempt at establishing an out-of-band communication link. As a result, any wireless chargers receiving the message including this flag may attempt to establish out-of-band communications with this chargeable device. As noted previously, if a wireless charger receives a message including this flag while not sending power pulses, it may place the associated chargeable device on the "known distant" list. Similarly, if a wireless charger receives a message including this flag and the associated chargeable device is on a "known distant" list, it may remove the chargeable device from the list and attempt to establish an out-of-band communication channel.

In a sixth resolution technique, information communicated between a chargeable device and wireless charger via the out-of-band communication channel may be used to indicate a misconnection. For example, in certain embodiments of the present invention, the chargeable device may transmit information to the wireless charger indicating various parameters that may be associated with the chargeable device. For example, the chargeable device may transmit information indicating a type of device (e.g., a tablet device, a headset, a laptop, a mobile phone, etc.) or a maximum power rating of the device (e.g., 0.5 W, 4.2 W, 11 W, etc.). A wireless charger will be subject to an impedance change when an object enters the wireless power field. The wireless charger may compare the expected impedance change based on the information received to the measured impedance change. If the measured change is close to what was expected, it is less likely that there is a misconnection. As with any of the resolution techniques described herein, when a misconnection is identified, a misconnection recovery routine may be initiated.

In a seventh resolution technique, proximity sensors may be used to detect a new device placed within a region near the wireless charger. Such proximity sensors may further be used to detect the presence of living organisms. A wireless charger including these proximity sensors may evaluate the lapsed time between detecting a device and a subsequent new connection request. As in the first resolution technique, if a device detection occurs close in time to a new connection request, it is less likely that there is a misconnection.

In an eighth resolution technique, the relative location of a chargeable device to a wireless charger may be estimated. With location information, establishing a proper out-of-band communication channel is made easier. One method of estimating the relative location of the chargeable device to the wireless charger involves techniques similar to triangulation. In this method, two or more antennas may be included in the wireless charger. Signal strength and/or phase shift may be measured on signals transmitted between these antennas and the chargeable device. In the case of two antennas, the location of the chargeable device may be estimated to be somewhere along the circular intersection of two spheres with a maximum radius based on the range of the out-of-band communication channel. This resolution may be adequate to estimate whether the chargeable device is within the wireless charger's field.

Figure 9:
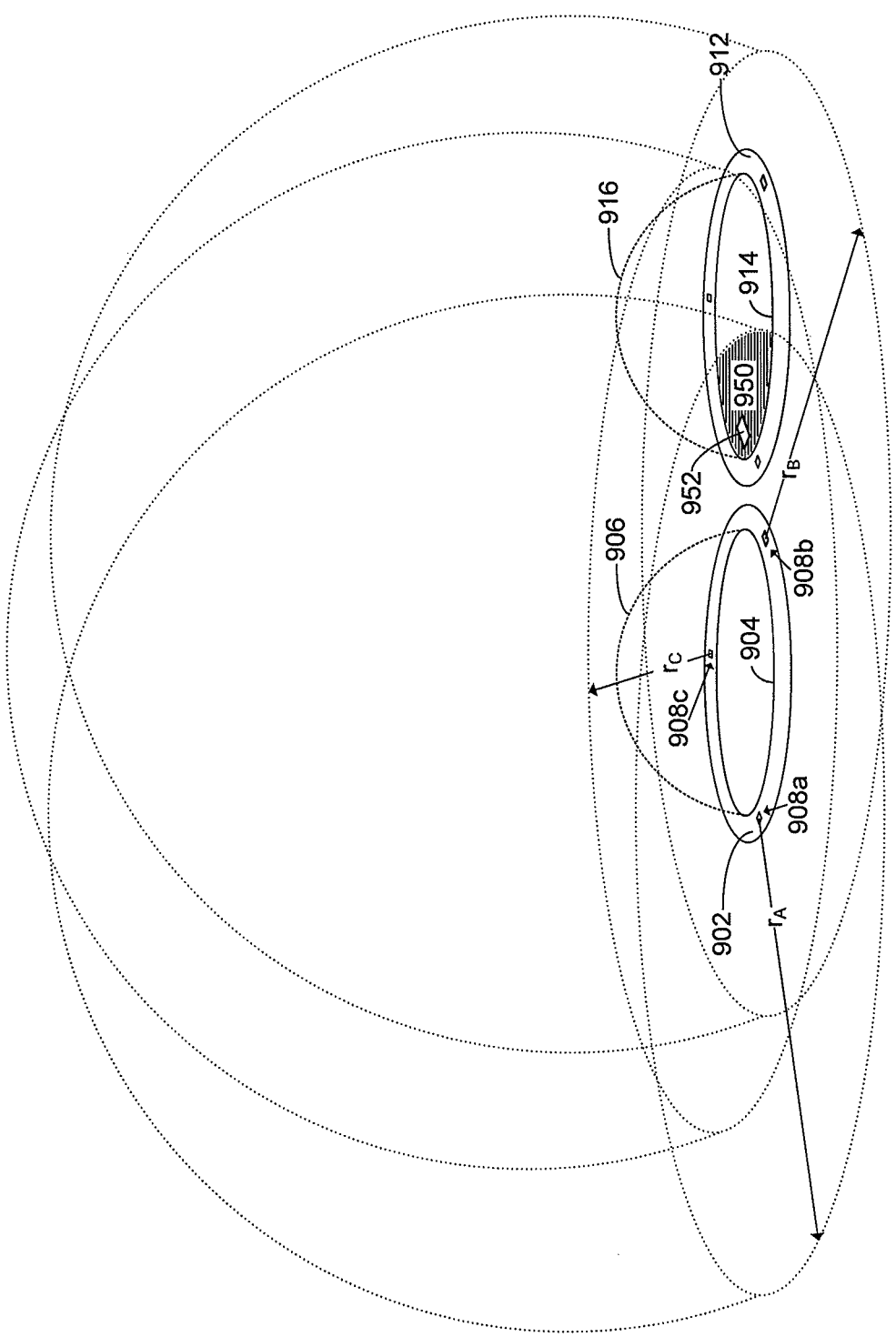
FIG. 9 depicts two co-located wireless chargers, each having three antennas for out-of-band communication.

Additional antennas may be added and corresponding measurements taken to improve the accuracy of the location estimate. FIG. 9 depicts two co-located wireless chargers, each having three antennas for out-of-band communication. The transmit antenna 904 of wireless charger 902 enables effective wireless power transmission within charging region 906. Similarly, the transmit antenna 914 of wireless charger 912 enables effective wireless power transmission within charging region 916. The wireless charger 902 further includes three out-of-band antennas 908a, 908b, and 908c. Each of antennas 908a, 908b, and 908c has an effective communication range $r_A$, $r_B$, and $r_C$, respectively. Given the proximity of the wireless chargers 902 and 912, a region 950 exists where a chargeable device 952 may be located within the charging region 916 of wireless charger 912 and within out-of-band communication range of wireless charger 902. If the chargeable device 952 attempts to establish communication with wireless charger 902, a controller or other device may estimate the distance between each of out-of-band antennas 908a-c and chargeable device 952 based at least in part on a signal strength measurement of a broadcast or other signal originating from the chargeable device 952.

While the chargeable device 952 and wireless charger may be spatially located relative to each other in a variety of ways, here we assume the chargeable device 952 and wireless charger are in substantially the same plane. After converting or correlating the signal strengths with estimated distances, the location of the chargeable device 952 may be estimated as follows. First, we assume the locations of the three out-of-band antennas relative to the charging region are known and assigned coordinate locations ($R0_x$, $R0_y$), ($R1_x$, $R1_y$), and ($R2_x$, $R2_y$). Combining the known positions of the out-of-band antennas with the associated distance estimates, D0, D1, and D2, the estimated location of the chargeable device, ($T_x$, Ty), may be calculated via the following equations.

$$(T_x-R0_x)^2+(T_y-R0_y)^2=D0^2$$

$$(T_x-R1_x)^2+(T_y-R1_y)^2=D1^2$$

$$(T_x-R2_x)^2+(T_y-R2_y)^2=D2^2$$

If the estimated location of the chargeable device is not within the charging region of the wireless charger, the wireless charger may notify the chargeable device of the misconnect. Further communications between the wireless charger and chargeable device may be terminated and the connection closed. If the estimated location of the chargeable device is within the charging region of the wireless charger, the wireless charger may optionally disable out-of-band antennas unnecessary for continued communications and begin (or continue) the transfer of power. Note that in other embodiments, the out-of-band antennas 908a, 908b, and 908c may transmit signals to the chargeable device 952, which may estimate distances to each of the out-of-band antennas and, if necessary, notify the wireless charger 902 of a misconnect.

With continued reference to FIG. 9, although the depicted charging regions 906, 916 may suggest omnidirectional antennas, directional out-of-band antennas may be incorporated in the wireless charger. The main lobe or primary gain direction of the directional antennas would be preferably directed toward the charging area. This may improve the location estimate of the chargeable device and also reduce the likelihood of a misconnect by reducing the size of the overlapping operational communication regions of the out-of-band antennas.

Figure 10:
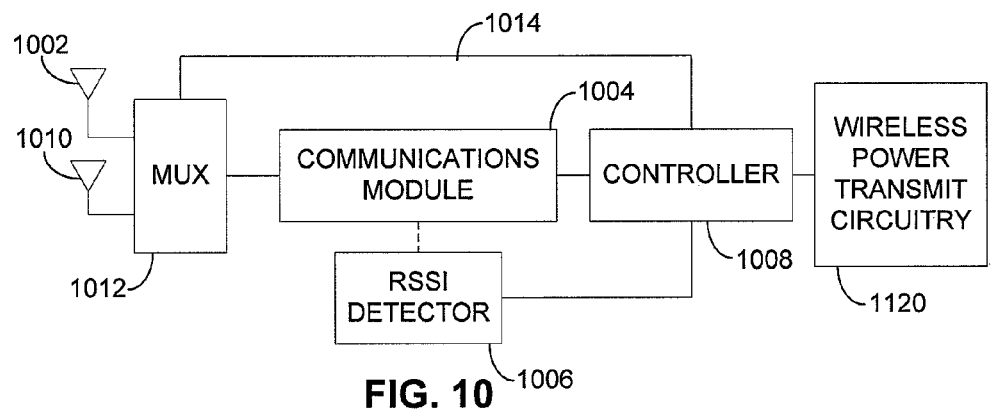
FIG. 10 is a block diagram of a wireless charger with communications circuitry shared between out-of-band antennas.

The out-of-band antennas may have separate signal strength/phase shift measurement circuitry, or share circuitry via a mux. FIG. 10 is a block diagram of a wireless charger with communications circuitry shared between out-of-band antennas. Out-of-band antennas 1002 and 1010 are each coupled to a mux 1012, which may be controlled by a controller 1008. The mux is coupled to a communications module 1004. Communications module 1004 may include a transceiver to control the transmission and reception of data via at least one of the out-of-band antennas 1002 and 1010. Communications module may further operate under the control of controller 1008 and according to one or more protocols (e.g., Bluetooth, ZigBee, cellular, WiFi, NFC, or others). An RSSI detector 1006 is coupled to the communications module and may measure the signal strength and/or phase of signals received by the two out-of-band antennas and provide the measured data to the controller 1008 for location estimation. The RSSI detector 1006 may provide the signal strength as a digital value to be read by the controller 1008 or as an analog voltage level which may be sampled by the controller 1008 via an analog-to-digital converter (not shown).

With this shared circuitry configuration, any gains introduced by the communications module 1004 or RSSI detector 1006 are common and thus likely have negligible impact on location estimation. However, any signal paths or traces from the out-of-band antennas 1002 and 1010 to the mux 1012 are preferably impedance and length matched to negate any skew or signal integrity issues that may impact the signal strength of phase of the signals used for location estimation. Note that because each out-of-band communications antenna in this configuration shares communications circuitry, some delay may be introduced during location estimation as only one out-of-band antenna may be transmitting or receiving at a time.

Figure 11:
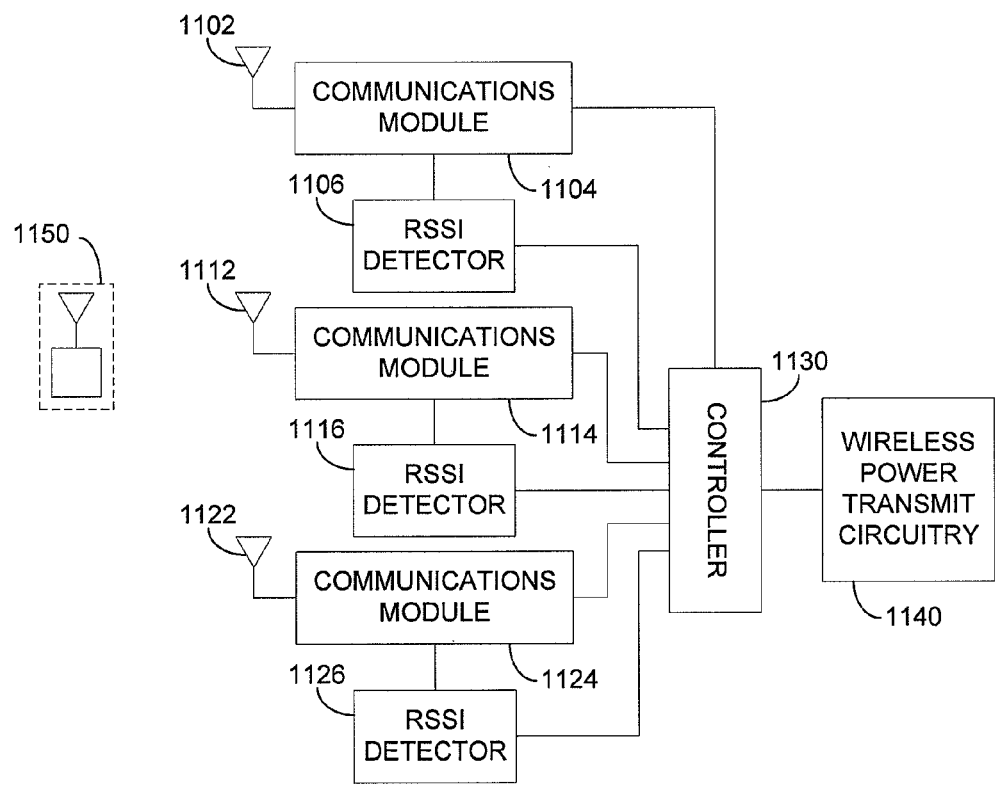
FIG. 11 is a block diagram of a wireless charger with independent communications circuitry for each out-of-band antenna.

As an alternative to the wireless charger detailed in FIG. 10, FIG. 11 is a block diagram of a wireless charger with independent communications circuitry for each out-of-band antenna. In this configuration, each of the out-of-band antennas may transmit or receive at any given time, reducing the amount of time for location estimation at the expense of additional components and/or cost. In contrast to FIG. 10, this configuration does not include a mux but instead includes parallel communications channels as described above. That is, out-of-band antenna 1101 has dedicated communications module 1104 and RSSI detector 1106, out-of-band antenna 1112 has dedicated communications module 1114 and RSSI detector 1116, and out-of-band antenna 1122 has dedicated communications module 1124 and RSSI detector 1126. RSSI detectors 1106, 1116, and 1126 may measure the signal strengths and/or the phases of the signals received by the out-of-band antennas.

Again, any signal paths or traces from the out-of-band antennas 1102, 1112, and 1122 are preferable impedance and length matched to their respective communications modules 1104, 1114, and 1124. However, to account for varying path gains which may be due to device or other variations, it may be desirable to calibrate the RSSI detectors via a calibration routine. One calibration routine may include a calibration standard 1150 located at a fixed point relative to the locations of out-of-band antennas 1102, 1112, and 1122. The signal strength and phase of communications between the calibration standard 1150 and each of the out-of-band antennas may be measured and stored for each channel as correction factors which may be used in later location estimates. This calibration may occur during manufacture. Another calibration approach might involve self-calibration. Each out-of-band antenna may transmit signals to and from each of the other out-of-band antennas, measuring the signal strength and/or phase of each transmission. Combining this information with the known positions of the out-of-band antennas, a controller may calculate the correction factors for the charger.

A second method of estimating location involves observing the received signal strength indication (RSSI) associated with communications received from the chargeable device. A controller may use the RSSI determined during normal communications between the wireless charger and chargeable device as a gauge for whether the chargeable device is within a range. The wireless charger may compare the RSSI against one or more thresholds which may, for example, be based upon received information received about the chargeable device. This information may include information related to the out-of-band transmit circuitry of the chargeable device. While this method may not provide sufficient accuracy to resolve communications between a chargeable device and multiple closely spaced wireless chargers, it may be adequate for sufficiently spaced wireless chargers.

Figure 12:
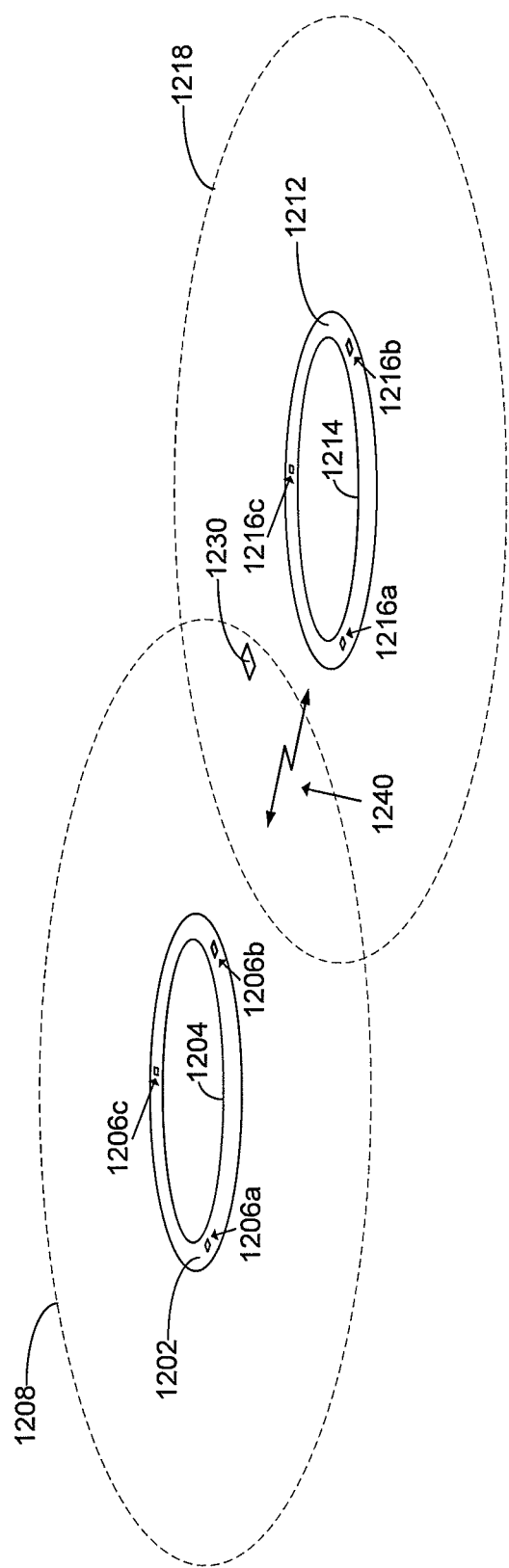
FIG. 12 depicts two co-located wireless chargers which may communicate with each other.

A third method contemplates wireless chargers configured to communicate amongst each other. Such communications can be used to bolster the confidence with which a particular chargeable device and wireless charger are co-located. For example, RSSI measurements between a chargeable device and a plurality of wireless chargers may be stored and shared amongst the wireless chargers. In this manner, the wireless chargers may act as antennas contemplated in the first method of estimating location, discussed above. FIG. 12 depicts two co-located wireless chargers which may communicate with each other. The wireless charger 1202 has a charging region 1208 while the wireless charger 1212 has a charging region 1218. The wireless chargers 1202 and 1212 may communicate via an out-of-band communication channel 1240. Thus at power up, a controller of a wireless charger may attempt to discover any other wireless chargers in the vicinity and notify any other chargers of its presence. As shown, a chargeable device 1230 is positioned closer to wireless charger 1212 than wireless charger 1202 yet within the charging regions 1208, 1218 of both chargers. In this scenario, chargeable device 1230 and wireless charger 1202 may communicate via an out-of-band communication channel. A controller of the wireless charger 1202 may estimate the location of the chargeable device 1230 to be at the outer limits of its charging region 1208. The controller of the wireless charger 1202 may notify the chargeable device 1230 and/or the wireless charger 1212 of the estimated position and/or RSSI/phase measurements via an out-of-band communication channel. Subsequently, the wireless charger 1212 and chargeable device 1230 may communicate via an out-of-band communication channel. A controller of the wireless charger 1212 may estimate the location of the chargeable device 1230 and compare its estimate with the estimate received from wireless charger 1202. Upon determining the chargeable device 1230 is in a better location of charging region 1218 (e.g., a higher magnetic flux density due to proximity), the controller of wireless charger 1212 may continue or commence wireless power transfer and may optionally notify wireless charger 1202 of the estimated position and/or RSSI/phase measurements. In another scenario where the controller of wireless charger 1212 estimated the location of chargeable device 1230 to be without charging region 1218 (not depicted), wireless charger 1212 may indicate as much to wireless charger 1202 and/or chargeable device 1230. Wireless charger 1202 may proceed to charge chargeable device 1230. As a result, by introducing communication amongst wireless chargers, it is possible to estimate the location of a chargeable device relative to other wireless chargers to allow charging to occur between the chargeable device and the optimally located wireless charger.

Figure 13:
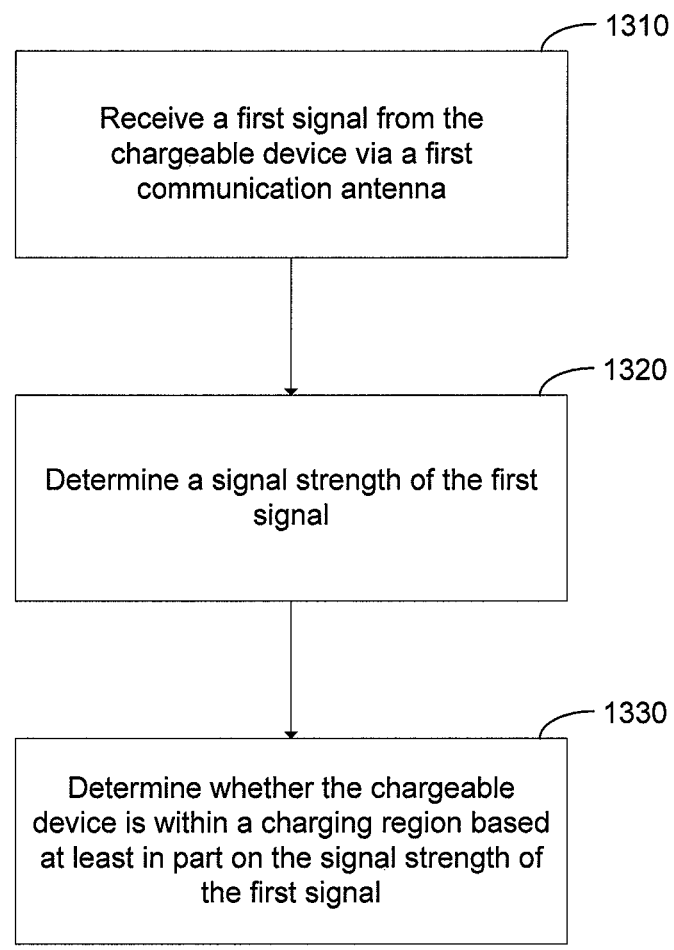
FIG. 13 is a flowchart of an exemplary method for verifying communications with a chargeable device based upon a signal strength.

FIG. 13 is a flowchart of an exemplary method for verifying communications with a chargeable device based upon a signal strength. At block 1310, the wireless charger receives a first signal from the chargeable device via a first communication antenna. The communication antenna is distinct from the antenna used to transmit power wirelessly and operates at a different frequency. At block 1320, the wireless charger determines a signal strength of the first signal. At block 1330, the wireless charger determines whether the chargeable device is within a charging region based at least in part on the signal strength of the first signal. In addition to the above, the phase of the first signal may also be detected and used to further refine the determination of whether the chargeable device is within the charging region. As an alternative to or in conjunction with the phase measurement, the signal strengths of multiple signals received via multiple communications antennas may be used to further triangulate or refine the determination. Upon determining whether the chargeable device is within the charging region, the wireless charger may enable, disable, or continue wireless power transmission depending on whether the chargeable device is within the charging region. The wireless charger may also transmit or receive information related to the chargeable device, including whether the chargeable device is within a charging region and any signal strengths, to or from another wireless charger.

In a ninth resolution technique, in-band signaling may be used to definitively rule out misconnections. With in-band signaling, the chargeable device can modulate the received power field to communicate to the wireless charger. If the charger does not receive the in-band signal, then the chargeable device is misconnected. If it does receive the in-band signal, then the chargeable device is correctly connected. As with any of the other resolution techniques described above, when a misconnection is identified, a misconnection recovery routine may be initiated.

Except where described, the resolution techniques disclosed above may not determine proper out-of-band communication channel connection with absolute certainty. Because the various resolution techniques disclosed above exhibit certain tradeoffs (e.g., range, resolution, accuracy, transparency, and speed of determination), one or more of these resolution techniques may be implemented simultaneously or sequentially within a wireless power system to improve the degree of certainty. Further, not all resolution techniques need be given equal weight in estimating the likelihood of a misconnect. Weighting factors may be determined experimentally and/or tailored for the particular wireless power system. Moreover, determinative techniques such as in-band signaling may be used to supplement other combinations of techniques.

As misconnections are identified, both wireless chargers and chargeable devices may track previously established out-of-band communications channels based on static or dynamic addressing of previously connected devices. For example, a wireless charger may detect a broadcast from a chargeable device associated with a previous misconnect. In such a case, the wireless charger may refuse to respond to the broadcast, subject to various factors including the amount of time since the misconnect. Example schemes used to uniquely identify a wireless charger may include those used in any of the out-of-band communications channels contemplated herein (Bluetooth, ZigBee, cellular, WiFi, NFC, etc.) As another example, when a misconnection is identified, a wireless charger could force the chargeable device to trigger a misconnection recovery routine, for example by resetting its communication channel and restarting its connection attempts, hopefully locating the correct wireless charger on the next (or on some subsequent) attempt.

Figure 14:
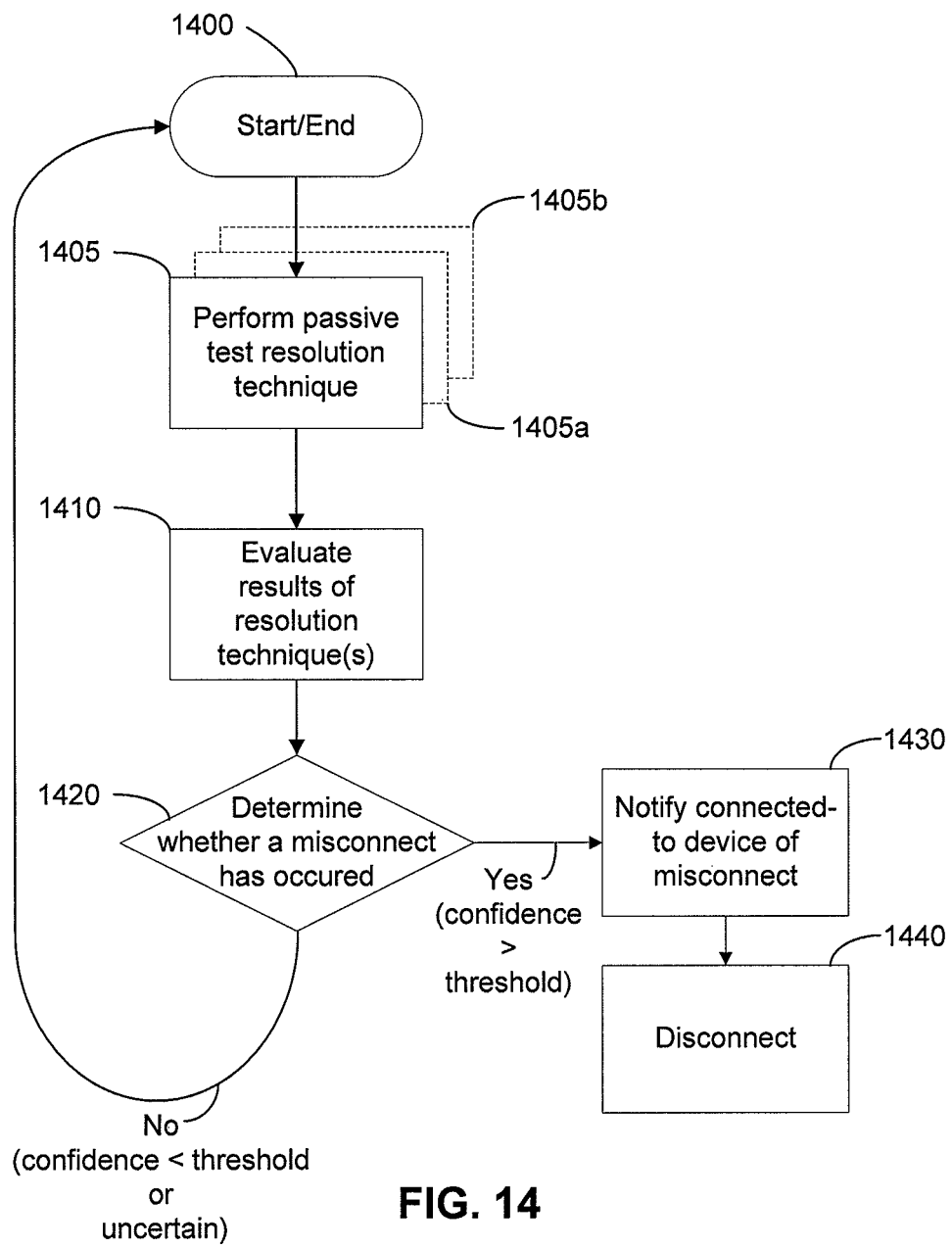
FIG. 14 is a flowchart of an exemplary method for evaluating an out-of-band communication channel connection between a receiver and a transmitter.

FIG. 14 is a flowchart of an exemplary method for evaluating whether an out-of-band communication channel is properly connected. At step 1400, a controller (not shown) begins to evaluate whether an established out-of-band communication channel is properly connected between a transmitter and receiver (e.g., whether receiver can receive wireless power from connected transmitter.) At steps 1405, 1405*a*, and 1405*b*, one or more resolution techniques may be performed. As depicted, step 1405 performs a passive resolution technique, discussed above. Optionally, steps 1405*a* or 1405*b* may include other resolution techniques (e.g., active tests, impedance variation, location estimation). At step 1410, the controller evaluates the resulting outputs from the one or more resolution techniques performed to produce an evaluation output (e.g., confidence level or probability). At step 1420, the controller determines whether a misconnection occurs. If the evaluation output indicates there is a low likelihood of misconnection, or if the output is uncertain, the process may repeat or terminate as needed. However, if a misconnect is likely (e.g., the evaluation output exceeds some threshold), at step 1430 the controller may optionally notify the remotely connected device and subsequently, at step 1440, disconnect, or drop, the out-of-band communication channel. Of course, while the resolution techniques described above were performed in parallel, in other embodiments additional resolution techniques 1405*a* and 1405*b* may be subsequently performed after step 1420 should the evaluation output be uncertain.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for transmitting power wirelessly may comprise transmit antenna 214, 352, 414, 714, 904, 914, 1204, or 1214. Means for generating a wireless charging field may comprise transmit circuitry 206, 406, or circuitry included in wireless power transmitter 710. Means for transmitting or receiving communication signals may comprise any of out-of-band antennas 724, 908*a-c*, 1002, 1010, 1102, 1112, 1122, 1206*a-c*, and 1216*a-c*. Means for communicating may comprise communication transceiver 720 or communication module 1004, 1104, 1114, or 1124. Means for determining a signal strength may comprise RSSI detector 1006, 1106, 1116, or 1126. Means determining whether the chargeable device is within the charging region may encompass a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. Means for determining whether the chargeable device is within the charging region may also comprise controller 415, 730, 1008, or 1130.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless charger for transmitting wireless charging power to a chargeable device, the wireless charger comprising:
   a wireless power antenna;
   a wireless power transmitter coupled to the wireless power antenna and configured to generate a wireless charging field in a charging region;
   a first communication antenna;
   a first transceiver coupled to the first communication antenna and configured to wirelessly communicate with the chargeable device by receiving at least a first wireless signal from the chargeable device via the first communication antenna, the chargeable device separate from the wireless charger;
   a first signal strength detector configured to determine a signal strength of the first wireless signal received by the first transceiver from the chargeable device; and
   a controller configured to determine a timing of the first wireless signal and to determine whether to establish a communication channel with the chargeable device based at least in part upon the timing of the first wireless signal and the signal strength of the first wireless signal indicative of the chargeable device being within the charging region.

2. The wireless charger of claim 1, wherein the controller is further configured to enable the wireless power transmitter upon determination that the chargeable device is within the charging region.

3. The wireless charger of claim 1, wherein the controller is further configured to disable the wireless power transmitter upon determination that the chargeable device is outside of the charging region.

4. The wireless charger of claim 3, wherein the controller is further configured to cease any transmissions between the first transceiver and the chargeable device.

5. The wireless charger of claim 1, wherein the controller is further configured transmit a notification to at least one of the chargeable device or another wireless charger via the first communication antenna, the notification including information related to the signal strength of the first wireless signal.

6. The wireless charger of claim 5, wherein the notification further includes information related to whether the chargeable device is within the charging region.

7. The wireless charger of claim 1, further comprising:
   a phase detector configured to measure a phase of the first wireless signal received by the transceiver; and
   wherein the controller is further configured to determine whether the chargeable device is within the charging region based at least in part on the phase of the first wireless signal.

8. The wireless charger of claim 1, further comprising:
   a second communication antenna;
   a second transceiver coupled to the communication antenna and configured to communicate with the chargeable device via the communication antenna;
   a second signal strength detector configured to determine a signal strength of a second wireless signal received by the second transceiver; and
   wherein the controller is further configured to determine whether the chargeable device is within the charging region based at least in part on the signal strength of the second wireless signal.

9. The wireless charger of claim 8, further comprising:
   a multiplexor configured to selectively couple the first communication antenna or the second communication antenna to the first transceiver;
   wherein the second transceiver is the first transceiver; and
   wherein the second signal strength detector is the first signal strength detector.

10. The wireless charger of claim 8, wherein the first wireless signal is the second wireless signal.

11. The wireless charger of claim 8, wherein the first and second communication antennas are directional antennas.

12. The wireless charger of claim 1, further comprising:
a load detector configure to detect a load on a power pulse, wherein the wireless power transmitter is further configured to transmit the power pulse;
wherein the controller is configured to scan, in response to the detected load, for broadcast from the chargeable device;
wherein the transceiver is further configured to receive a broadcast from the chargeable device and transmit a connection request to establish the communication channel with the chargeable device in response to the broadcast.

13. The wireless charger of claim 1, wherein the controller is further configured to detect a modulation of the wireless charging field by the chargeable device and further determine whether to establish the communication channel with the chargeable device based upon the modulation of the wireless charging field.

14. The wireless charger of claim 1, wherein the controller is further configured to maintain a list of one or more chargeable devices, and wherein the determination of whether to establish the communication channel with the chargeable device is further based upon whether the chargeable device is present on the maintained list.

15. The wireless charger of claim 1, wherein the controller is further configured to track an electrical characteristic of the wireless charging field relative to an electrical characteristic of the chargeable device, and determine whether to maintain the communication channel with the chargeable device based upon a relationship between the tracked electrical characteristic of the wireless charging field and the electrical characteristic of the chargeable device.

16. A method for transmitting wireless charging power to a chargeable device via a wireless charger, the method comprising:
receiving, at the wireless charger, a first wireless signal from the chargeable device via a first communication antenna of the wireless charger, the chargeable device being separate from the wireless charger;
determining, at the wireless charger, a first signal strength of the first wireless signal and a second signal strength of the second wireless signal;
determining, at the wireless charger, a timing of the first wireless signal; and
determining, at the wireless charger, whether to establish a communication channel with the chargeable device based at least in part upon the timing of the first wireless signal and the signal strength of the first wireless signal indicative of the chargeable device being within a charging region.

17. The method of claim 16, further comprising enabling a wireless power transmitter upon determination that the chargeable device is within the charging region.

18. The method of claim 16, further comprising disabling a wireless power transmitter upon determination that the chargeable device is outside of the charging region.

19. The method of claim 18, further comprising ceasing any communication transmissions between a transceiver coupled to the first communication antenna and the chargeable device.

20. The method of claim 16, further comprising transmitting a notification to at least one of the chargeable device or another wireless charger via the first communication antenna, the notification including information related to the signal strength of the first wireless signal.

21. The method of claim 20, wherein the notification further includes information related to whether the chargeable device is within the charging region.

22. The method of claim 16, further comprising:
detecting a phase of the first wireless signal; and
wherein the determining whether the chargeable device is within a charging region is further based at least in part on the phase of the first wireless signal.

23. The method of claim 16, further comprising:
receiving a second wireless signal from the chargeable device via a second communication antenna;
determining a signal strength of the second wireless signal; and
wherein the determining whether the chargeable device is within a charging region is further based at least in part on the signal strength of the second wireless signal.

24. The wireless charger of claim 23, wherein the first and second communication antennas are directional antennas.

25. The method according to claim 16 further comprising:
transmitting a power pulse from the wireless charger;
detecting, at the wireless charger, a load on the power pulse;
scanning, in response to the detected load, for a broadcast from the chargeable device;
receiving a broadcast from the chargeable device; and
transmitting a connection request to establish the communication channel with the chargeable device in response to the broadcast.

26. A wireless charger for transmitting wireless charging power to a chargeable device, the wireless charger comprising:
means for transmitting power wirelessly;
means for generating a wireless charging field in a charging region via the means for transmitting power;
first means for transmitting or receiving communication signals;
first means for wirelessly communicating with the chargeable device by receiving a first wireless signal from the chargeable device via the first means for transmitting or receiving communication signals, the chargeable device separate from the wireless charger;
first means for determining a first signal strength of the first wireless signal from the chargeable device received by the first means for communicating;
means for determining a timing of the first wireless signal; and
means for determining whether to establish a communication channel with the chargeable device based at least in part upon the timing of the first wireless signal and the signal strength of the first wireless signal indicative of the chargeable device being within the charging region.

27. The wireless charger of claim 26, further comprising means for enabling the means for transmitting power wirelessly upon determination that the chargeable device is within the charging region.

28. The wireless charger of claim 26, further comprising means for transmitting a notification to at least one of the chargeable device or another wireless charger via the means for transmitting or receiving signals, the notification including information related to the signal strength of the first wireless signal.

29. The wireless charger of claim 26, further comprising:
means for measuring a phase of the first wireless signal received by the means for communicating; and wherein the determining whether the chargeable device is within the charging region is additionally based at least in part on the phase of the first wireless signal.

30. The wireless charger of claim 26, further comprising:
another means for transmitting or receiving communication signals;
another means for communicating with the chargeable device via the another means for transmitting or receiving communication signals;
means for determining a signal strength of a second signal received by the another means for communicating; and
wherein the determining whether the chargeable device is within the charging region is additionally based at least in part on the signal strength of the second signal.

* * * * *